United States Patent [19]

Nagano

[11] 3,886,806
[45] June 3, 1975

[54] OPERATING LEVER FOR ACTUATING A GEAR-SHIFTING MEANS MOUNTED ON A BICYCLE

[75] Inventor: Masashi Nagano, Osaka, Japan

[73] Assignee: Shimaro Industrial Co., Ltd., Japan

[22] Filed: May 22, 1973

[21] Appl. No.: 362,845

[30] Foreign Application Priority Data
July 20, 1972 Japan.............................. 47-72909
July 20, 1972 Japan.............................. 47-72910
July 20, 1972 Japan.............................. 47-72911

[52] U.S. Cl. .................. 74/491; 74/523; 74/531; 188/82.6; 192/8 C
[51] Int. Cl............. G05g 5/16; F16d 49/02
[58] Field of Search ...... 192/8 C; 74/491, 523, 531; 188/82.6, 77 W

[56] References Cited
UNITED STATES PATENTS

| | | | |
|---|---|---|---|
| 307,663 | 11/1884 | Lane................... | 192/8 C |
| 823,971 | 6/1906 | Remondy............... | 192/8 C |
| 887,180 | 5/1908 | Barnes................. | 74/531 |
| 1,552,697 | 9/1925 | Heinz.................. | 192/8 C |
| 2,173,126 | 9/1939 | Moore.................. | 192/8 C |
| 2,220,599 | 11/1940 | Galter................. | 188/82.6 X |
| 2,803,972 | 8/1957 | Leigh.................. | 192/8 C |
| 2,961,217 | 11/1960 | Sacchini............... | 188/82.6 X |
| 3,400,605 | 9/1968 | Hood................... | 74/531 |
| 3,693,469 | 9/1972 | Ozaki.................. | 74/531 X |

Primary Examiner—Allan D. Herrmann
Attorney, Agent, or Firm—Toren, McGeady and Stanger

[57] ABSTRACT

An operating lever for transmitting a desired movement to a gear-shifting means for bicycles through a control cable so as to actuate the means thereby changing the speed of a bicycle, said lever comprising a spring fastened around a fixed shaft mounted on a bicycle frame member or handle portion, or around a cylindrical member freely mounted on said shaft, said spring having one end retained on a lever body supported by said fixed shaft or said cylindrical member, and being adapted to disengage its tightening relation to said fixed shaft or said cylindrical member when said lever body is moved in the direction of pulling the control cable against a return cable mounted to the gear-shifting means thereby making it possible to manipulate the lever body with a light touch operation.

12 Claims, 8 Drawing Figures

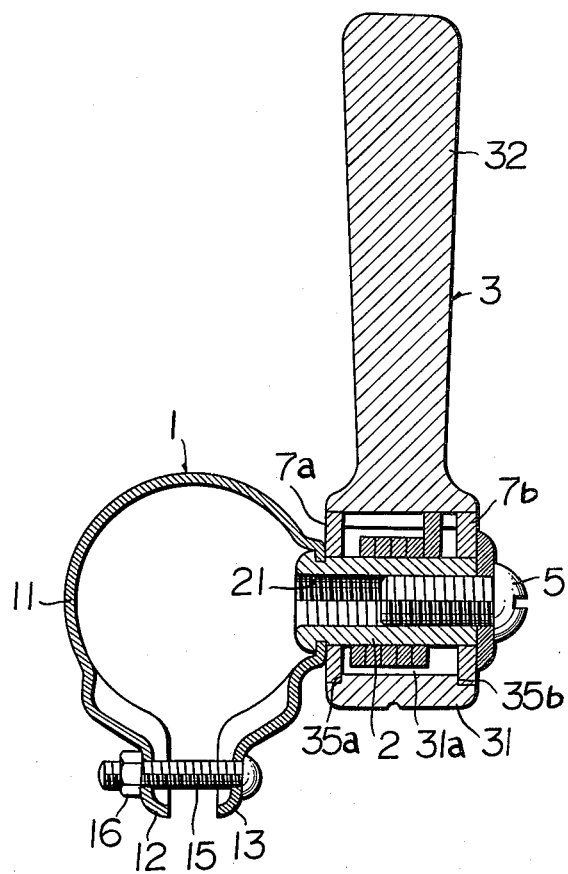
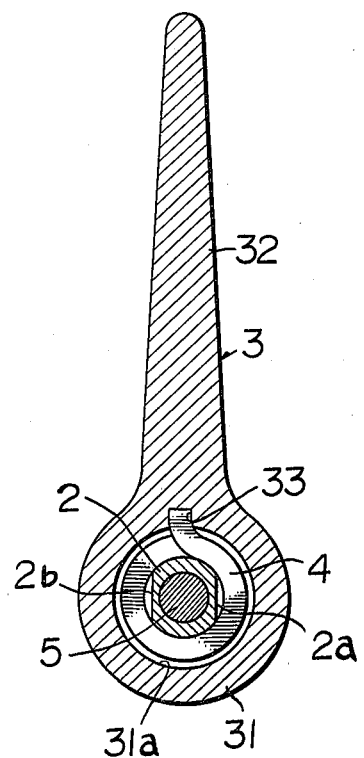

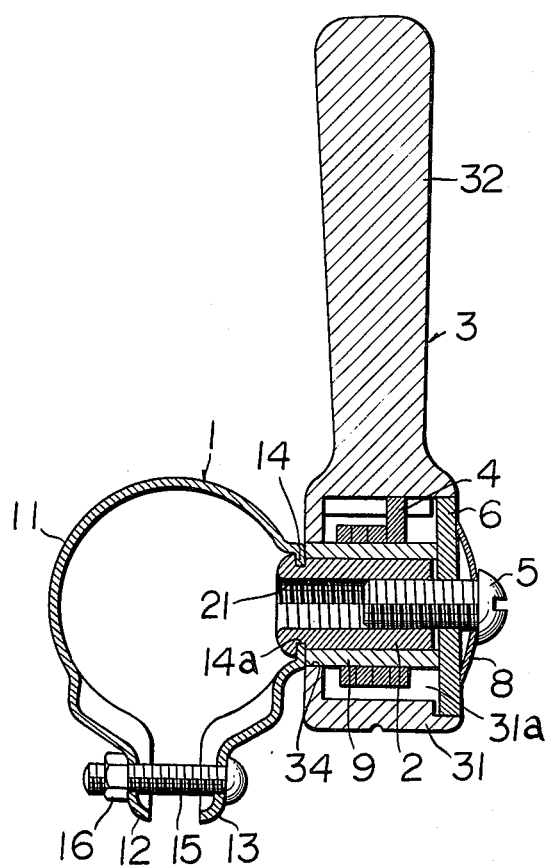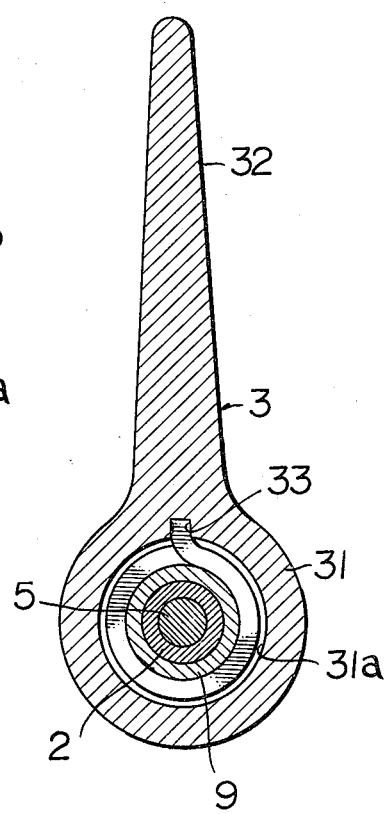

OPERATING LEVER FOR ACTUATING A GEAR-SHIFTING MEANS MOUNTED ON A BICYCLE

The present invention relates to improvements in an operating lever for actuating a gear-shifting means mounted on a bicycle.

For the purpose of changing the speed of a running bicycle, it is customary to actuate a gear-shifting means of the bicycle by transmitting thereto the operating motion of an operating lever mounted on a suitable frame member or handle portion of the bicycle through a control cable.

The above-mentioned conventional gear-shifting means are mainly classified into two types — an inner housing gear-shifting means and an outer housing gear-shifting means; the former is housed in a rear wheel hub of the bicycle and the latter is adapted to induce a driving chain to selectively engage with respect to a plurality of sprocket wheels mounted to the end of a shaft of the rear wheel. These two types are provided in common with a return spring having strong resiliency so as to urge the gear-shifting means to move swiftly.

Thus when the aforesaid gear-shifting means is actuated through a control cable by operating an operating lever just as has been mentioned, the operation of the lever to one direction is effected against the resiliency of the return spring while the operation of the lever to the other direction is urged by the pulling force of the return spring. Consequently there is caused a fatal drawback that when the lever is operated in said one direction it must be subjected to an excessive resistance whereas it is quite free of such resistance when it is operated in said other direction.

Preferably the operating lever is bestowed with a frictional resistance or force which is strong enough to overcome the pulling force of the return spring so that it can be fixedly held in a position to which it is moved. Thus when moved to the aforesaid one direction, the lever must be loaded with this force in addition to the pulling force of the return spring. This results that the lever is made very heavy for a cyclist to operate by hand. Further in order to change the direction of operating the operating lever, a cyclist must manipulate the lever with a greater force than before so that the swift and accurate operation is made difficult. In other words, the lever can be operated very lightly in one direction only where the return spring acts; thus when a cyclist operates the lever in this direction, he often applies an excessive force thereto so that the the lever runs over a position where he intended to actuate the gear-shifting means in order to change the running speed of a bicycle into a desired rate.

Accordingly, the present invention has been designed to obviate the above-mentioned drawbacks of the conventional operating levers and has as one of its main objects the provision of such a lever as can be manipulated easily and accurately with a light touch operation against the pulling force of the return spring mounted on a gear-shifting means.

It is another object of the invention to provide the operating lever by means of which the position wherein the gear-shifting operation is intended to be actuated can be effectively held without being moved by the pulling force of the return spring.

It is a further object of the invention to provide the operating lever that can be operated to actuate the gear-shifting means swiftly and accurately with a uniform manipulating force on any occasions even if the lever is operated in a reverse direction.

These and other objects, features and advantages of the present invention will become apparent from the following detailed description and appended claims when taken in conjunction with the accompanying drawings, in which:

FIG. 3a shows how the lever body is operated against the return spring of a subsequently described gear-shifting system, and FIG. 3b shows how the lever body is operated in the same direction as the return spring pulls it;

FIG. 4 is a vertical sectioned front elevation showing another embodiment of the invention;

FIG. 5 is a vertical sectioned side elevation thereof;

FIG. 6 is a vertical sectioned front elevation showing a further embodiment of the invention; and FIG. 7 is a vertical sectioned side elevation thereof.

Figure 1:
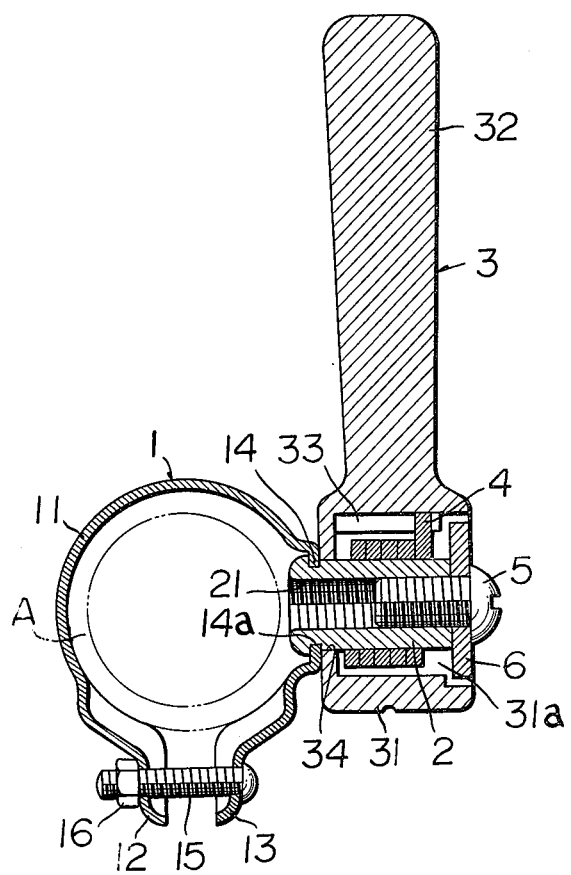
FIG. 1 is a vertical sectioned front elevation of the operating lever embodied in accordance with the invention.
Figure 2:
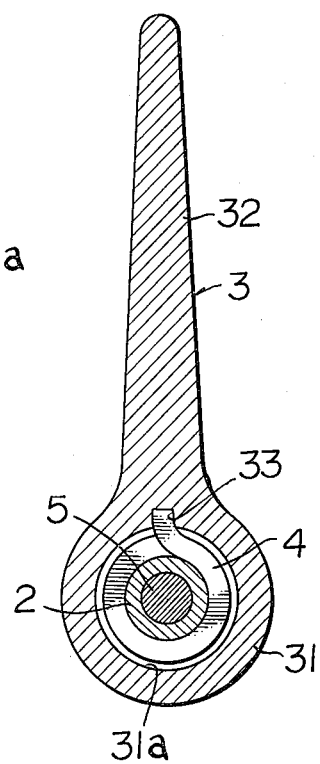
FIG. 2 is a vertical sectioned side elevation thereof.

Referring now to the drawings, reference numeral 1 designates a fixture means to be fixedly mounted on a frame member A of a bicycle. Said fixture means 1 comprises a tightening member 11 which is wound around the frame member A, a pair of flange portions 12, 13 which are formed on both ends of the tightening member 11 and a retaining portion 14 which is formed intermediate the tightening member 11. A bolt 15 is inserted through the flange portions 12, 13 and screwably engaged with a tightening nut 16 in a manner that when this nut is turned to constrictively tighten the flange portions 12, 13, the tightening member 11 is made to support the frame member A so as to permit said fixture means 1 to be fixedly mounted on the frame member A. Furthermore, the retaining portion 14 is bored with a through hole 14a into which a subsequently described fixed shaft 2 can be inserted. Said fixed shaft 2, unrotatably mounted onto the frame member A through the fixture means 1, is formed into a cylindrical shape which has an inner peripheral surface defined with a screw thread 21. Said fixed shaft 2 has its one end inserted into the through hole 14a of the retaining portion 14 and peened in unmovable relation therewith so as to be unrotatably held in the retaining portion 14.

An operating lever 3 is rotatably supported on the fixed shaft 2 and comprises a boss 31 having an annular recess 31a and a pinching portion 32 extending integrally from the boss 31. In the inner peripheral surface of the annular recess 31a in said boss 31 there is formed a groove 33 adapted to retain one end of a coil spring 4 which will be described hereinafter. Said boss 31 is bored with a through hole 34 into which the fixture means 1 is to be inserted so that the operating lever 3 can be inserted into the fixed shaft 2 through the through hole 34 and rotatably supported therein.

The coil spring 4 wound or fastened around the fixed shaft 2 has its one end bent outwardly in the radial direction thereof and forcibly intruded into said groove 33 so as to be retained thereon rotatably together with the operating lever 3. The other end of the coil spring 4 is held in slidable contact with the outer periphery of the fixed shaft 2.

As has been mentioned above, the coil spring 4 is so formed that its inner diameter is substantially smaller than the outer diameter of the fixed shaft 2. Thus this spring 4 can be constrictively tightened around the fixed shaft 2 by applying to the former a greater force than the pulling force of a return spring B which is mounted on a gear-shifting means (not shown in the drawings). Due to this formation, the coil spring 4 can be held fixedly on the fixed shaft 2 in spite of the pulling force caused by the dynamic stability of the return spring. The result is that a desired speed change rate can always be obtained.

By reference numeral 5 is shown a tightening screw inserted into a threaded groove 21 of the fixed shaft 2. Said tightening screw 5 is adapted to hold a subsequently described end plate 6 against the end of the fixed shaft 2 so that said end plate 6 serves to close the annular recess 31a of the lever body 3 and at the same time prevent the latter from coming off the fixed shaft 2.

In the present embodiment, the lever body 3 is connected through the control cable to the gear-shifting means (not shown in the drawings) so that a cyclist is able to selectively change the speed of a running bicycle into any desired rate through the gear-shifting means by means of the lever body 3 which is operated to rotate around the fixed shaft 2.

Nextly, reference will be made in detail to the operational condition of the lever body 3 particularly with respect to FIGS. 3a and 3b of the drawings; in which reference character B generally designates a return spring mounted to the gear-shifting means, and C denotes a control cable.

In this embodiment, the lever body 3 is adapted to be moved about the fixed shaft 2 with the pinching portion 32 held between a cyclist's fingertips in order to pull the control cable C. More particularly, said lever body 3 can be operated to rotate in the direction of an arrow X shown in the drawing against the resiliency of the return spring B. In this case, the coil spring 4 is slackened as shown in FIG. 3a and its tightened relationship with the fixed shaft 2 is released to such an extent that the lever body 3 is permitted to rotate almost freely with respect to the fixed shaft. Thus, it follows that the lever body 3 can be moved with such a force as is at most strong enough to overcome the pulling force of the return spring B, consequently enabling a cyclist to operate the lever body 3 with a light touch operation. Further in case a cyclist releases his fingertips from the pinching portion 32 after the gear-shifting means has been actuated in the above-mentioned manner, the coil spring 4 is caused to be fastened around the fixed shaft 2.

Accordingly, even if the resiliency of the return spring B acts on the lever body 3 through the control cable C to move the lever body 3 about the fixed shaft 2, the force with which the coil spring 4 is fastened around the fixed shaft is greater than the pulling force of the return spring B so that the lever body 3 is retained through the coil spring 4 to the fixed shaft 2, consequently being held in a position where it has just been moved.

Further in case the lever body 3 is pulled by the pulling force of the return spring B in a manner as has been referred to, said pulling force causes the coil spring 4 to tighten the fixed shaft more constrictively than before so that said position of the lever body 3 can be maintained more effectively.

Figure 3A:
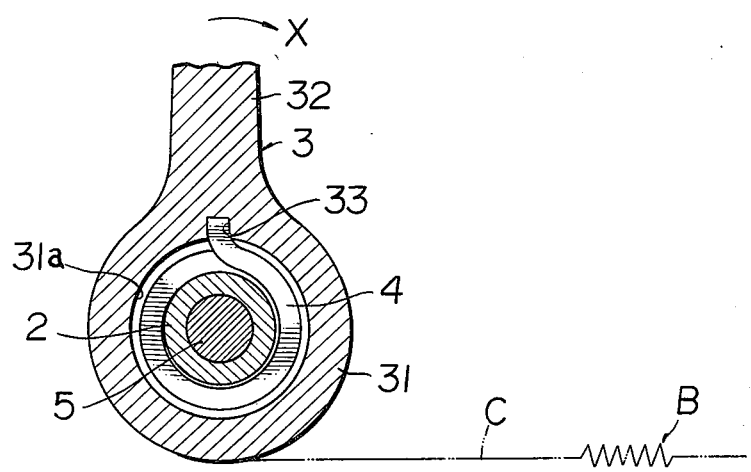
FIGS. 3a and 3b are vertical sectioned side elevation of the elemental parts thereof, showing how the lever is operated; in which especially
Figure 3B:
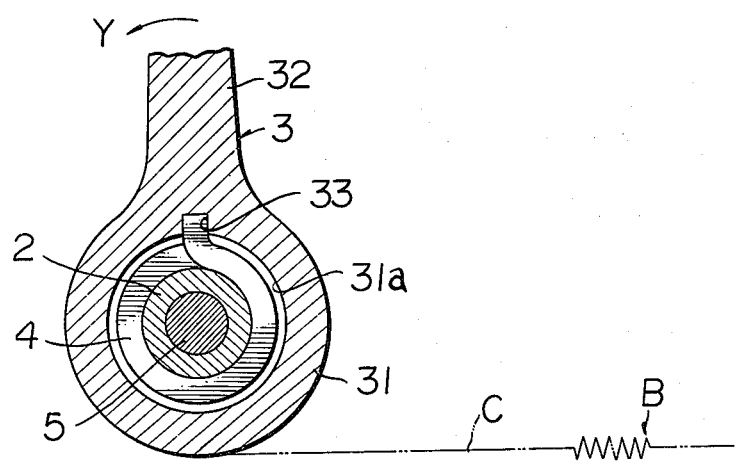

In contrast thereto, when the lever body 3 is operated to move in the same direction as that in which the return spring B acts, or in the direction of an arrow Y shown in the drawing, the coil spring 4 is fastened more tightly around the fixed shaft 2 as is shown in FIGS. 3a and 3b thus causing a great frictional resistance against the movement of the lever body 3 with respect to the fixed shaft 2.

In this case, however, the return cable C acts in said same direction so that the lever body 3 can be moved with a small force corresponding to the difference between said frictional resistance and said pulling force.

As has been mentioned hereinabove, when the lever body 3 is moved against the return spring B, the coil spring 4 is released to disengage its fastening relation with respect to the fixed shaft 2, thus enabling a cyclist to easily operate the lever body 3 merely by applying thereto a resisting force against the return spring. Furthermore, when the lever body 3 is moved in the reverse direction, it is subjected to said tightening or fastening force; but in this case, the pulling force of the return spring also acts in the same direction of said tightening or fastening force so that the operation of the lever body can be effected with a force corresponding to the difference between the tightening force and the pulling force, thus still enabling a cyclist to manipulate the lever with a light touch operation. Besides, according to the present invention, there is an additional advantage that the lever body 3 can be selectively operated in any direction shown by the arrows X and Y with almost same force irrespective of the directions.

The conventional return spring is generally provided with a pulling force determined in accordance with the construction of a gear-shifting means to which the return spring is to be applied so that the determined pulling force, once provided on the return spring, cannot be modified without difficulty. However, the coil spring 4 in the present invention is adapted to be selectively fastened around the fixed shaft 2 so that in case the return spring B is bestowed, for example, with the pulling force of 10 Kg to the tightening force of 15 Kg, the latter tightening force with which the lever body 3 is operated to move toward the arrow X is zero or almost close thereto whereby the lever body 3 can be readily operated by applying thereto a greater force than the pulling force 10 Kg; furthermore, the operation of the lever body 3 to move toward the arrow Y can be easily effected by applying to the lever body a greater force than 5 Kg which is the difference between the tightening force of 15 Kg and the pulling force of 10 Kg. Therefore, it is understood that at most the force necessary for a cyclist to operate the lever body is such as can resist the pulling force of the return spring B.

In this case, the difference between the operating force of the lever body toward the arrow X and that toward the arrow Y is as small as 5 Kg. Further, if the tightening force is determined to be 20 Kg, the force necessary for a cyclist to operate the lever body toward the arrow X or Y is as small as 10 Kg.

According to the present invention, said lever body 3 can be easily manipulated with a light touch operation even if the operation of the lever body is suddenly changed in the reverse direction, thus enabling a cyclist to operate the lever swiftly and accurately at any time without fear of permitting the same to move over a position to which he intends.

Incidentally, in the above-mentioned preferred embodiment of the present invention there is described and illustrated the lever body 3 that is frictionally supported on the fixed shaft 2 by means of the coil spring 4. However, the lever body 3 may be so formed as is shown in FIGS. 4 and 5 wherein a lever body 3 is provided with a different type frictional means adapted to give thereto a frictional resistance thereby to support the lever body 3 on a fixed shaft 2 in cooperation with said frictional means.

In this case, a fixed shaft 2 supported by the fixture means 1 is cut off in the opposed two sides peripheral of the shaft 2 along the longitudinal direction thereof so as to form flat surface areas 2a and 2b.

A pair of doughnut shape disks 7a, 7b each having a through hole corresponding to the peripheral shape of the fixed shaft 2 are inserted into the both side surfaces of the fixed shaft 2 centrally thereof in such a manner that said disks 7a, 7b are permitted to move in the axial direction of the fixed shaft 2 but prevented from rotating about this shaft. Therefore, annular recesses 35a, 35b are formed on both axial ends of a through hole perforated through the lever body 3 rotatably supported on the fixed shaft 2 in a manner that they are disposed to face said pair of doughnut shape disks 7a, 7b whereby these disks are subjected to a determined frictional resistance against said annular recesses 35a, 35b to give a desired friction to the rotation of the lever body 3.

Incidentally, the adjustment of said frictional resistance is effected by the screwable tightening of the tightening screw 5 screwably inserted through a threaded hole 21 of the fixed shaft 2.

The force with which said coil spring 4 is fastened around a fixed shaft 2 may be smaller than the pulling force of the return spring mounted to a gear-shifting means. In other words, a total of the tightening force of the coil spring 4 to the fixed shaft 2 and the frictional resistance of the disks 7a, 7b against the lever body 3 may be greater than the pulling force of the return spring.

In addition, said frictional resistance can be selectively and easily adjusted, as has been mentioned, so that even if the tightening force of the coil spring 4 or the pulling force of the return spring is out of order, such disordered force can be readily adjusted.

Further, the operating lever of the present invention can also be embodied in such a manner for example as is illustrated in FIGS. 6 and 7 wherein a cylindrical member 9 is rotatably mounted to a fixed shaft 2 supported by means of a fixture means 1 so as to rotatably support a lever body 3 on said cylindrical member 9, the both end surface areas thereof being then disposed to face an end plate 6 of the fixed shaft 2 and a holding portion 14 of the fixture means 1 so as to give to said cylindrical member 9 a frictional resistance which is caused between the end surface areas of the cylindrical member 9 and the end plate 6 of the fixed shaft 2.

Incidentally, said frictional resistance is previously made a little greater than the pulling force of the return spring. That is, the lever body 3 in the present embodiment is such that a plate spring 8 is mounted between said end plate 6 and the tightening screw 5 screwed into the fixed shaft 3 so as to bestow the cylindrical member 9 with a determined frictional resistance caused by the tightening force of the tightening screw 5. Thus when the cylindrical member 9 is rotated together with the lever body 3 by the tightening force of said coil spring 4, the lever body 3 is also subjected to said frictional resistance; but when the cylindrical member 9 is rotated reversely, that is to say, when it stays stationary with respect to the rotation of the lever body 3, the frictional resistance is not permitted to act on the lever body 3.

In case the lever body 3 thus constructed is moved against the return spring B, the coil spring 4 is loosened as has been mentioned above whereby the lever body 3 is not subjected to said frictional resistance but permitted to rotate free of the cylindrical member 9; However, when moved reversely or in the direction where the return spring B acts, the lever body 3 is rotated together with the cylindrical member 9 by the tightening force of the coil spring 4. In this case, the operation of the lever body 3 can be effected with a force corresponding to the difference between said frictional resistance and said pulling force of the return spring B.

According to the above-mentioned construction, said frictional resistance can be easily and selectively adjusted so that even if the tightening force of the coil spring or the pulling force of the return spring is somewhat disordered, such disordered force can be minutely corrected by adjusting the frictional resistance. In addition, this frictional resistance does not act in the least on the operation of the lever body being effected against the return spring, thus enabling a cyclist to manipulate the operating lever very easily with a light touch operation.

Though some specific embodiments of the present invention have been shown and described herein, it will be apparent to those skilled in the art that the invention is not restricted to the details set forth but many changes and modifications may be made without departing from the spirit and scope of the invention as defined in the annexed claims.

What is claimed is:

1. An apparatus for operating a gear-shifting means for bicycles comprising an operating lever, a control cable connected to said operating lever and arranged to be connected to the gear shifting means, a return spring associated with said control cable for returning said gear shifting means to a certain position, said operating lever arranged to pull said control cable against the action of said return spring for releasing the cable and shifting the gear shifting means, said operating lever comprising a fixed shaft unrotatably mounted to a bicycle through a fixture means, a lever body rotatably supported on said fixed shaft and connected to one end of said control cable, a spring means fastened around said fixed shaft, having one end retained by said lever body and the other end kept in slidable contact with said fixed shaft, said spring means being formed, when in released state, to have a smaller inner diameter than the outer diameter of said fixed shaft and adapted to be fastened around said shaft in the direction where it can be released when moved against said return spring, and said spring means arranged for maintaining said lever body against said return spring in a position where said lever body has been moved for shifting said gear shifting means.

2. The operating lever, as set forth in claim 1, wherein said spring means fastened around said fixed shaft is a coil spring.

3. The operating lever, as set forth in claim 1, wherein said spring means fastened around said fixed shaft is a cylindrical spring made of a single flat steel plate.

4. The operating lever, as set forth in claim 1, wherein said spring means fastened around said fixed shaft is bestowed with a greater force of tightening said shaft than the pulling force of said return spring mounted to said gear-shifting means thereby to hold said lever body in a position where it has been moved to actuate said gear-shifting means.

5. The operating lever, as set forth in claim 1, wherein a means for causing a determined frictional resistance is provided between said lever body and said fixed shaft thereby to give said frictional resistance to the movement of said lever body, a total of said frictional resistance given to said lever body and the fastening force of said spring round said fixed shaft being slightly greater than the pulling force of said return spring.

6. The operating lever, as set forth in claim 5, wherein disks are mounted to said fixed shaft in axially rotatable relation therewith so as to provide said frictional resistance to said lever body, said lever body having a boss portion disposed between said disks in opposed relation with said portion, and being tightened by means of tightening screws from one direction of said disks thereby to keep said disks and said boss portion in frictional contact with each other.

7. An operating lever connected through a control cable to a gear-shifting means for bicycles and adapted to pull said control cable against a return spring mounted on said means or release said cable thereby to actuate said means, said operating lever comprising
   a. a fixed shaft unrotatably mounted to a bicyle through a fixture means,
   b. a cylindrical member rotatably mounted on said fixed shaft,
   c. a means for bestowing the rotation of said cylindrical member with a slightly greater frictional resistance than the pulling force of said return spring,
   d. a lever body rotatably supported on said fixed shaft and connected to one end of said control cable, and
   e. a spring means fastened around said cylindrical member, having one end retained by said lever body and the other end kept in slidable contact with said cylindrical member, said spring means being formed, when in released state, to have a smaller inner diameter than the outer diameter of said fixed shaft and adapted to be fastened round said shaft in the direction where it can be released when moved against said return spring.

8. The operating lever, as set forth in claim 7, wherein said cylindrical member has one end kept in contact with said fixture means and the other end projected from the free end of said fixed shaft, said projected other end being disposed in opposed relation to an end plate for rigidly fixing said fixed shaft by means of a tightening screw thereby to keep said end plate and said projected other end of said cylindrical member in frictional contact with each other.

9. An operating lever connected through a control cable to a gear-shifting means for bicycles and arranged to pull the control cable against a return spring mounted on the shifting means or to release the cable thereby to actuate the shifting means, said operating lever comprising a fixture means arranged to be secured on a bicycle frame member, a fixed shaft unrotatably mounted in said fixture means, a lever body rotatably supported on said fixed shaft and arranged to be connected to one end of the control cable, a spring means fastened around said fixed shaft and having one end thereof secured to said lever body and the other end thereof maintained in sliding contact with said fixed shaft, said spring means being formed, when in the released state, to have a smaller inner diameter than the outer diameter of said fixed shaft and being mounted around said shaft in the direction where it can be released when moved against the return spring, and said spring means can hold said lever body on said fixed shaft against the return spring in a position where said lever body has been moved to actuate the gear-shifting means.

10. An operating lever, as set forth in claim 9, wherein said spring means fastened around said fixed shaft is a coil spring.

11. An operating lever, as set forth in claim 9, wherein said spring means fastened around said fixed shaft is bestowed with a greater force for tightening about said shaft than the pulling force of the return spring attached to the gear-shifting means for holding said lever body in a position to which it has been moved in operating the gear-shifting means.

12. An operating lever, as set forth in claim 9, wherein a means for effecting a determined frictional resistance is provided between said lever body and said fixed shaft for applying the frictional resistance to the movement of said lever body, a total of the frictional resistance applied to said lever body and the fastening force of said spring means disposed around said fixed shaft is slightly greater than the pulling force of the return spring.

* * * * *